(12) United States Patent
Kodama et al.

(10) Patent No.: US 12,531,640 B2
(45) Date of Patent: Jan. 20, 2026

(54) OPTICAL SIGNAL STATE ESTIMATION APPARATUS, OPTICAL SIGNAL STATE ESTIMATION METHOD, AND NON-TRANSITORY COMPUTER-READABLE STORAGE MEDIUM

(71) Applicant: NEC Corporation, Tokyo (JP)

(72) Inventors: Jun Kodama, Tokyo (JP); Yoshiaki Sakae, Tokyo (JP); Yuji Kobayashi, Tokyo (JP); Etsuko Ichihara, Tokyo (JP); Jun Nishioka, Tokyo (JP); Takashi Konashi, Tokyo (JP); Hiroki Tagato, Tokyo (JP)

(73) Assignee: NEC CORPORATION, Tokyo (JP)

( * ) Notice: Subject to any disclaimer, the term of this patent is extended or adjusted under 35 U.S.C. 154(b) by 258 days.

(21) Appl. No.: 18/225,942

(22) Filed: Jul. 25, 2023

(65) Prior Publication Data

US 2024/0039640 A1    Feb. 1, 2024

(30) Foreign Application Priority Data

Jul. 29, 2022  (JP) ................... 2022-122109

(51) Int. Cl.
*H04B 10/61*   (2013.01)
*H04B 10/556*  (2013.01)

(52) U.S. Cl.
CPC ..... *H04B 10/6165* (2013.01); *H04B 10/5561* (2013.01)

(58) Field of Classification Search
CPC ................. H04B 10/5561; H04B 10/6165
(Continued)

(56) References Cited

U.S. PATENT DOCUMENTS 9,912,414 B2 *   3/2018  Jia .................. H04L 25/03019
2014/0363154 A1  12/2014  Saito et al.
(Continued)

FOREIGN PATENT DOCUMENTS

JP    2014-236503 A   12/2014
JP    6225493 B2      11/2017
(Continued)

OTHER PUBLICATIONS

Lui et al; OLS-Based RBF Neural Network for Nonlinear and Linear Impairments Compensation in the CO-OFDM System; Apr. 2018, IEEE Photonics Journal; pp. 1-9. (Year: 2018).*

(Continued)

*Primary Examiner* — Amritbir K Sandhu
(74) *Attorney, Agent, or Firm* — Sughrue Mion, PLLC

(57) ABSTRACT

At least one processor included in an optical signal state estimation apparatus carries out: an acquisition process for acquiring a constellation of an optical signal; a generation process for generating time series data in which pieces of histogram information are arranged in time series, the histogram information being obtained by counting the number of signal points of the constellation, the signal points being included in each of grids obtained by dividing an in-phase component direction and a quadrature component direction into a specific number of rows and the specific number of columns, respectively; and an estimation process for estimating a state of the optical signal by inputting the time series data to a learned model.

8 Claims, 5 Drawing Sheets

(58) Field of Classification Search
USPC .......................................................... 398/208
See application file for complete search history.

(56) References Cited

U.S. PATENT DOCUMENTS

| | | | |
|---|---|---|---|
| 2017/0126360 A1 | 5/2017 | Millar et al. | |
| 2017/0163350 A1* | 6/2017 | Chien | H04B 10/614 |
| 2021/0013963 A1 | 1/2021 | Kuwabara et al. | |
| 2023/0018846 A1 | 1/2023 | Nakachi et al. | |

FOREIGN PATENT DOCUMENTS

| | | | |
|---|---|---|---|
| JP | 2018-518126 A | 7/2018 | |
| WO | WO-2019159938 A1 * | 8/2019 | H04B 10/0795 |
| WO | 2021/117163 A1 | 6/2021 | |
| WO | WO-2021262052 A1 * | 12/2021 | G06N 3/045 |

OTHER PUBLICATIONS

Simon et al; Optimized Flexible Mappings with Multidimensional Modulation for Coherent Optical Transport; Sep. 2019; Christian-Albrecht's-University Kiel, Germany; pp. 1-5. (Year: 2019).*

Doan et al; Learning Constellation Map with Deep CNN for Accurate Modulation Recognition ;Sep. 2020; National research foundation of Korea; pp. 1-6. (Year: 2020).*

\* cited by examiner

OPTICAL SIGNAL STATE ESTIMATION APPARATUS, OPTICAL SIGNAL STATE ESTIMATION METHOD, AND NON-TRANSITORY COMPUTER-READABLE STORAGE MEDIUM

This Nonprovisional application claims priority under U.S.C. § 119 on Patent Application No. 2022-122109 filed in Japan on Jul. 29, 2022, the entire contents of which are hereby incorporated by reference.

TECHNICAL FIELD

The present invention relates to an optical signal state estimation apparatus, an optical signal state estimation method, and a non-transitory computer-readable storage medium.

BACKGROUND ART

A technique is known by which a state of an optical signal transmitted through optical fiber is understood on the basis of an amplitude and/or a phase of the optical signal. Patent Literature 1 discloses an optical signal processing apparatus that (i) divides, into a plurality of divided regions, a plurality of symbol regions for classifying signal points specifying symbol information included in an optical signal, and (ii) calculates a phase noise of the optical signal on the basis of an aggregate number of signal points for each of the plurality of divided regions.

CITATION LIST

Patent Literature

[Patent Literature 1]
Japanese Patent Application Publication Tokukai No. 2014-236503

SUMMARY OF INVENTION

Technical Problem

The optical signal processing apparatus disclosed in Patent Literature 1 does not consider any change in signal point caused by the passage of time. Thus, the optical signal processing apparatus unfortunately makes it difficult to understand a state of an optical signal with high accuracy.

An example aspect of the present invention has been made in view of the above problems, and an example object thereof is to provide a technique for estimating a signal state of an optical signal with high accuracy.

Solution to Problem

An optical signal state estimation apparatus according to an example aspect of the present invention is an optical signal state estimation apparatus that estimates a state of an optical signal transmitted through optical fiber, the optical signal state estimation apparatus including at least one processor, the at least one processor carrying out: an acquisition process for acquiring a constellation of the optical signal; a generation process for generating time series data in which pieces of histogram information are arranged in time series, the histogram information being obtained by counting the number of signal points of the constellation that has been acquired within a certain time period, the signal points being included in each of grids obtained by dividing an in-phase component direction and a quadrature component direction into a specific number of rows and the specific number of columns, respectively; and an estimation process for estimating, by inputting, to a learned model trained with use of the time series data that has been generated from a constellation of a known state optical signal, the time series data that has been generated from the constellation of the optical signal to be estimated, a state of the optical signal to be estimated.

An optical signal state estimation method according to an example aspect of the present invention includes: (a) acquiring a constellation of an optical signal transmitted through optical fiber; (b) generating time series data in which pieces of histogram information are arranged in time series, the histogram information being obtained by counting the number of signal points of the constellation that has been acquired within a certain time period, the signal points being included in each of grids obtained by dividing an in-phase component direction and a quadrature component direction into a specific number of rows and the specific number of columns, respectively; and (c) estimating, by inputting, to a learned model trained with use of the time series data that has been generated from a constellation of a known state optical signal, the time series data that has been generated from the constellation of the optical signal to be estimated, a state of the optical signal to be estimated, (a), (b), and (c) each being carried out by at least one processor included in an optical signal state estimation apparatus that estimates a state of the optical signal.

A non-transitory computer-readable storage medium storing therein a program according to an example aspect of the present invention stores therein a program for causing a computer to carry out an optical signal state estimation method carried out by an optical signal state estimation apparatus that estimates a state of an optical signal transmitted through optical fiber, the program causing the computer to carry out: a process for acquiring a constellation of the optical signal; a process for generating time series data in which pieces of histogram information are arranged in time series, the histogram information being obtained by counting the number of signal points of the constellation that has been acquired within a certain time period, the signal points being included in each of grids obtained by dividing an in-phase component direction and a quadrature component direction into a specific number of rows and the specific number of columns, respectively; and a process for estimating, by inputting, to a learned model trained with use of the time series data that has been generated from a constellation of a known state optical signal, the time series data that has been generated from the constellation of the optical signal to be estimated, a state of the optical signal to be estimated.

Advantageous Effects of Invention

An example aspect of the present invention makes it possible to estimate a signal state of an optical signal with high accuracy.

EXAMPLE EMBODIMENTS

First Example Embodiment

Figure 1:
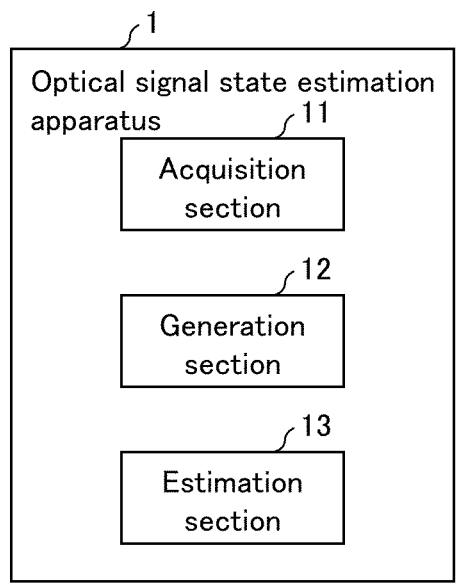
FIG. 1 is a block diagram illustrating an example configuration of an optical signal state estimation apparatus according to a first example embodiment of the present invention.

A first example embodiment of the present invention will be described in detail with reference to the drawings. The first example embodiment is an embodiment serving as a basis for example embodiments described later. Note that in this overview, reference numerals in the drawings are assigned, for convenience, to respective elements as an example for easier understanding, and are not intended to limit the present invention to aspects illustrated in the drawings. Furthermore, a direction in which connecting lines between blocks in, for example, the drawings to be referred to in the following description extend includes both a single direction and two directions. A unidirectional arrow schematically illustrates a flow of a main signal (data) and is not intended to exclude bidirectionality. Moreover, a point of connection between an input and an output of each of the blocks in the drawings may be configured to be provided with a port or an interface. However, such a configuration is not illustrated.

(Configuration of Optical Signal State Estimation Apparatus 1)

A configuration of an optical signal state estimation apparatus 1 according to the present example embodiment will be described with reference to FIG. 1. FIG. 1 is a block diagram illustrating an example configuration of the optical signal state estimation apparatus 1 according to the present example embodiment.

The optical signal state estimation apparatus 1 according to the present example embodiment estimates a state of an optical signal transmitted through optical fiber. The optical signal state estimation apparatus 1 includes an acquisition section 11, a generation section 12, and an estimation section 13 as illustrated in FIG. 1.

The acquisition section 11 acquires a constellation of an optical signal. The acquisition section 11 supplies the acquired constellation to the generation section 12.

The constellation is a definition of a signal point constellation that indicates a combination of a phase and an amplitude of a channel in an in-phase component direction (an I channel) and a channel in a quadrature component (a Q channel) in a digital quadrature modulation method such as QPSK or 16QAM.

The generation section 12 generates time series data in which pieces of histogram information are arranged in time series, the histogram information being obtained by counting the number of signal points of the constellation that has been acquired within a certain time period, the signal points being included in each of grids obtained by dividing an in-phase component direction and a quadrature component direction into a specific number of rows and the specific number of columns, respectively. The generation section 12 supplies the generated time series data to the estimation section 13.

The estimation section 13 estimates, by inputting, to a learned model trained with use of the time series data that has been generated from a constellation of a known state optical signal, the time series data that has been generated from the constellation of the optical signal to be estimated, a state of the optical signal to be estimated. Examples of the known state include a noise ratio (SN ratio) of the optical signal, crosstalk, and band narrowing.

The learned model is, for example, a learned model that has been generated by causing a neural network to carry out deep learning. Note here that examples of the neural network include a recurrent neural network (RNN).

As described above, a configuration is employed such that the optical signal state estimation apparatus 1 according to the present example embodiment includes: the acquisition section 11 that acquires a constellation of an optical signal; the generation section 12 that generates time series data in which pieces of histogram information are arranged in time series, the histogram information being obtained by counting the number of signal points of the constellation that has been acquired within a certain time period, the signal points being included in each of grids obtained by dividing an in-phase component direction and a quadrature component direction into a specific number of rows and the specific number of columns, respectively; and the estimation section 13 that estimates, by inputting, to a learned model trained with use of the time series data that has been generated from a constellation of a known state optical signal, the time series data that has been generated from the constellation of the optical signal to be estimated, a state of the optical signal to be estimated.

In this way, according to the optical signal state estimation apparatus 1 according to the present example embodiment, the time series data that has been generated from the constellation of the optical signal to be estimated is input to a learned model trained with use of the time series data that has been generated from a constellation of a known state optical signal. Thus, according to the optical signal state estimation apparatus 1 according to the present example embodiment, the state of the optical signal is estimated in consideration of a change in constellation caused by the passage of time. This makes it possible to estimate a signal state of the optical signal with high accuracy.

Furthermore, according to the optical signal state estimation apparatus 1 according to the present example embodiment, the constellation of the optical signal is not used as it is, but time series data is used instead in which pieces of histogram information are arranged in time series, the histogram information being obtained by counting the number of signal points included in each of grids obtained by dividing an in-phase component direction and a quadrature component direction into a specific number of rows and the specific number of columns, respectively. Thus, according to the optical signal state estimation apparatus 1 according to the present example embodiment, the state of the optical signal is estimated in consideration of a grid pattern of the constellation. This makes it possible to estimate the signal state of the optical signal with high accuracy.

(Flow of Optical Signal State Estimation Method S1)

Figure 2:
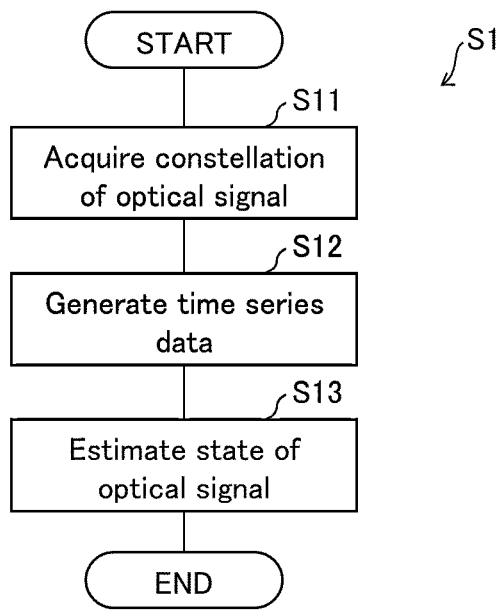
FIG. 2 is a flowchart illustrating a flow of an optical signal state estimation method according to the first example embodiment of the present invention.

A flow of an optical signal state estimation method S1 according to the present example embodiment will be described with reference to FIG. 2. FIG. 2 is a flowchart illustrating the flow of the optical signal state estimation method S1 according to the present example embodiment.

(Step S11)

In a step S11, the acquisition section 11 acquires a constellation of an optical signal. The acquisition section 11 supplies the acquired constellation to the generation section 12.

(Step S12)

In a step S12, the generation section 12 generates time series data in which pieces of histogram information are arranged in time series, the histogram information being obtained by counting the number of signal points of the constellation that has been acquired within a certain time period, the signal points being included in each of grids obtained by dividing an in-phase component direction and a quadrature component direction into a specific number of rows and the specific number of columns, respectively. The generation section 12 supplies the generated time series data to the estimation section 13.

(Step S13)

In a step S13, the estimation section 13 estimates, by inputting, to a learned model trained with use of the time series data that has been generated from a constellation of a known state optical signal, the time series data that has been generated from the constellation of the optical signal to be estimated, a state of the optical signal to be estimated.

As described above, a configuration is employed such that the optical signal state estimation method S1 according to the present example embodiment includes: the acquisition section 11 acquiring a constellation of an optical signal; the generation section 12 generating time series data in which pieces of histogram information are arranged in time series, the histogram information being obtained by counting the number of signal points of the constellation that has been acquired within a certain time period, the signal points being included in each of grids obtained by dividing an in-phase component direction and a quadrature component direction into a specific number of rows and the specific number of columns, respectively; and the estimation section 13 estimating, by inputting, to a learned model trained with use of the time series data that has been generated from a constellation of a known state optical signal, the time series data that has been generated from the constellation of the optical signal to be estimated, a state of the optical signal to be estimated. Thus, the optical signal state estimation method S1 according to the present example embodiment brings about an effect similar to that brought about by the optical signal state estimation apparatus 1 described earlier.

Second Example Embodiment

A second example embodiment of the present invention will be described in detail with reference to the drawings. Note that members having functions identical to those of the respective members described in the first example embodiment are given respective identical reference numerals, and a description of those members is omitted as appropriate.

(Configuration of Optical Signal Multiplexing Apparatus 100)

Figure 3:
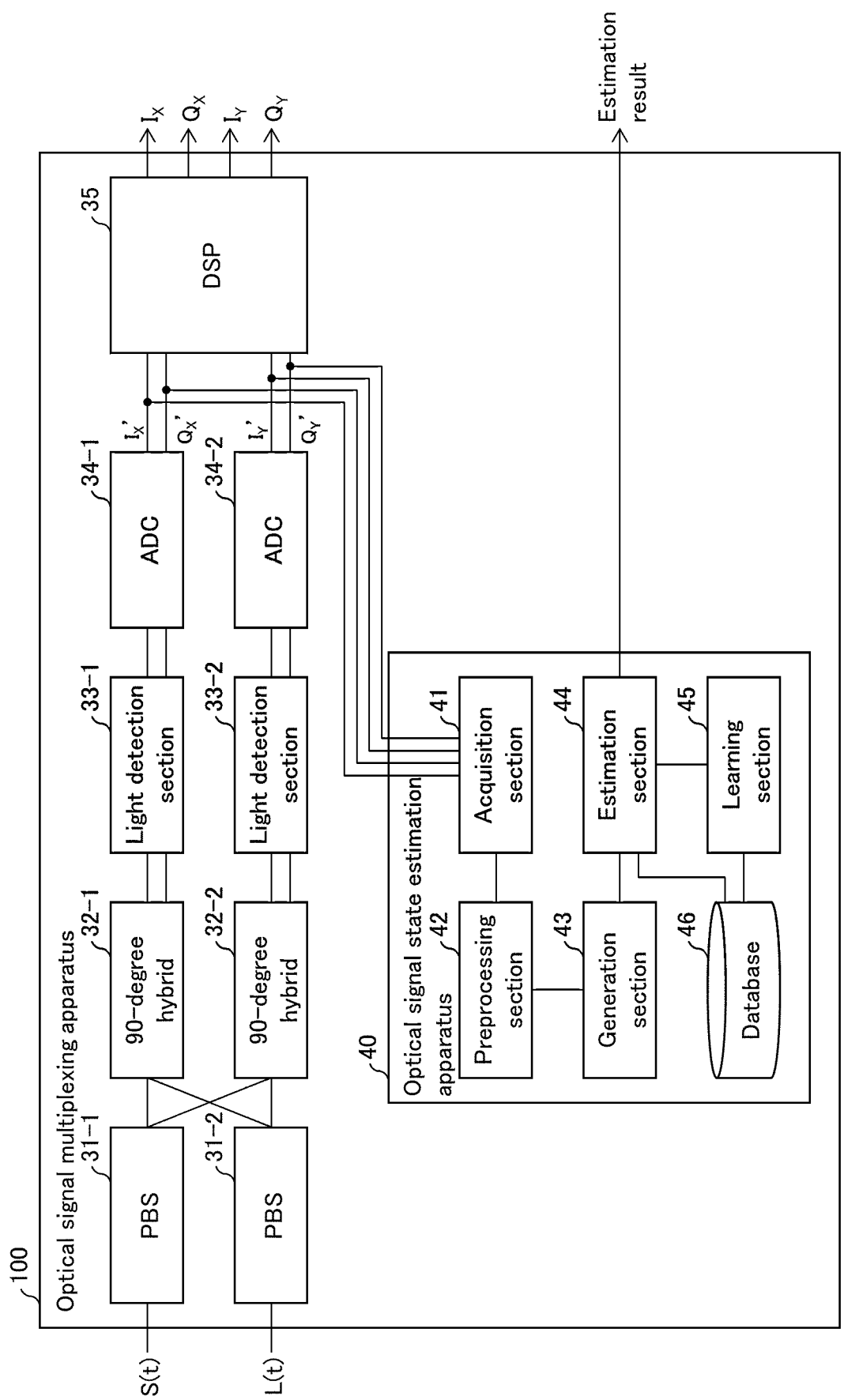
FIG. 3 is a block diagram illustrating an example configuration of an optical signal multiplexing apparatus according to a second example embodiment of the present invention.

A configuration of an optical signal multiplexing apparatus 100 according to the present example embodiment will be described with reference to FIG. 3. FIG. 3 is a block diagram illustrating an example configuration of the optical signal multiplexing apparatus 100 according to the present example embodiment.

The optical signal multiplexing apparatus 100 according to the present example embodiment is configured to include polarizing beam splitters (PBSs) 31-1 and 31-2, 90-degree hybrids 32-1 and 32-2, light detection sections 33-1 and 33-2, analog digital converters (ADCs) 34-1 and 34-2, and a digital signal processor (DSP) 35 as illustrated in FIG. 3. The optical signal multiplexing apparatus 100 according to the present example embodiment is an optical signal multiplexing apparatus including an optical signal state estimation apparatus 40, as illustrated in FIG. 3. FIG. 3 does not illustrate a configuration of a transmission part of an optical signal transmission section that transmits an optical signal. Note, however, that the optical signal transmission section can be realized by a common configuration.

The optical signal multiplexing apparatus 100 is an apparatus that multiplexes a plurality of optical signals input from a communication path. A modulation method for an optical signal is exemplified by, but not particularly limited to, a 16QAM modulation method and a 2A8PSK modulation method.

The PBS 31-1 carries out polarization separation with respect to an optical signal S (t) input from the communication path, outputs an X-polarized wave to the 90-degree hybrid 32-1, and outputs a Y-polarized wave to the hybrid 32-2. The PBS 31-2 carries out polarization separation with respect to localized light, outputs an X-polarized wave to the 90-degree hybrid 32-1, and outputs a Y-polarized wave to the 90-degree hybrid 32-2.

The 90-degree hybrid 32-1 combines, via two routes that differ in phase by 90 degrees, (i) an X-polarized wave component of the optical signal which is input from the PBS 31-1 and (ii) an X-polarized wave component of the localized light which is input from the PBS 31-2. The 90-degree hybrid 32-1 outputs, to the light detection section 33-1, an in-phase (I-phase) component signal and a quadrature-phase (Q-phase) component signal which have been generated by combining the optical signal and the localized light through the routes that differ in phase by 90 degrees.

The 90-degree hybrid 32-2 combines, via two routes that differ in phase by 90 degrees, (i) a Y-polarized wave component of the optical signal which is input from the PBS 31-1 and (ii) a Y-polarized wave component of the localized light which is input from the PBS 31-2. The 90-degree hybrid 32-2 outputs, to the light detection section 33-2, an I-phase component signal and a Q-phase component signal which have been generated by combining the optical signal and the localized light through the routes that differ in phase by 90 degrees.

Each of the light detection sections 33-1 and 33-2 is made of a photodiode, converts, into an electric signal, an optical signal input thereto, and outputs the electric signal. The light detection section 33-1 converts, into respective electrical signals, (i) an I-phase component optical signal of the X-polarized wave, the I-phase component optical signal being input from the 90-degree hybrid 32-1, and (ii) a Q-phase component optical signal of the X-polarized wave, the Q-phase component optical signal being input from the 90-degree hybrid 32-1, and outputs the electrical signals to the ADC 34-1. The light detection section 33-2 converts, into respective electrical signals, (i) an I-phase component optical signal of the Y-polarized wave, the I-phase component optical signal being input from the 90-degree hybrid 32-2, and (ii) a Q-phase component optical signal of the Y-polarized wave, the Q-phase component optical signal being input from the 90-degree hybrid 32-2, and outputs the electrical signals to the ADC 34-2.

The ADC 34-1 converts, into digital signals, analog signals that are input from the light detection section 33-1, and outputs, to the DSP 35, the digital signals as an I channel Ix' for the X-polarized wave and a Q channel Qx' for the X-polarized wave. The ADC 34-2 converts, into digital signals, analog signals that are input from the light detection section 33-2, and outputs, to the DSP 35, the digital signals as an I channel Iy' for the Y-polarized wave and a Q channel Qy' for the Y-polarized wave.

The DSP 35 carries out reception processes such as distortion correction, decoding, and error correction with respect to the signals input thereto, demodulates the electric signals that are input from the ADCs 34-1 and 34-2, and outputs the demodulated electric signals as the I channel Ix for the X-polarized wave, the Q channel Qx for the X-polarized wave, the I channel Iy for the Y-polarized wave, the Q channel Qy for the Y-polarized wave.

The optical signal state estimation apparatus 40 includes an acquisition section 41, a preprocessing section 42, a generation section 43, an estimation section 44, a learning section 45, and a database 46. The preprocessing section 42 and the generation section 43 are configured to achieve an estimation section in the present example embodiment. An example of processes carried out by sections included in the optical signal state estimation apparatus 40 will be described later.

The acquisition section 41 acquires a constellation of an optical signal. Specifically, the acquisition section 41 acquires the I channel Ix' for the X-polarized wave, the Q channel Qx' for the X-polarized wave, the I channel Iy' for the Y-polarized wave, and the Q channel Qy' for the Y-polarized wave. The I channel Ix' and the Q channel Qx' are output from the ADC 34-1, and the I channel Iy' and the Q channel Qy' are output from the ADC 34-2.

Note that the acquisition section 41 may be configured to acquire the I channel Ix for the X-polarized wave after demodulation, the Q channel Qx for the X-polarized wave after demodulation, the I channel Iy for the Y-polarized wave after demodulation, and the Q channel Qy for the Y-polarized wave after demodulation. The I channel Ix, the Q channel Qx, the I channel Iy, and the Q channel Qy are output from the DSP 35.

The preprocessing section 42 carries out preprocessing with respect to the I channel Ix' for the X-polarized wave, the Q channel Qx' for the X-polarized wave, the I channel Iy' for the Y-polarized wave, and the Q channel Qy' for the Y-polarized wave, and outputs a processing result to the generation section 43. The I channel Ix', the Q channel Qx', the I channel Iy', and the Q channel Qy' have been acquired by the acquisition section 41.

The generation section 43 generates time series data on the basis of the processing result that has been output from the preprocessing section 42.

The estimation section 44 estimates, by inputting, to a learned model trained with use of the time series data that has been generated from a constellation of a known state optical signal, the time series data that has been generated from the constellation of the optical signal to be estimated, a state of the optical signal to be estimated.

The learning section 45 uses the time series data stored in the database 46 (described later) and generated from the constellation of the known state optical signal to train the learned model used by the estimation section 44. For example, the learning section 45 uses, as training data, a plurality of sets of (i) a noise ratio of an optical signal in a certain time period and (ii) a constellation of the optical signal to train the learned model.

The database 46 is constituted by, for example, a non-volatile memory such as a flash memory, or a hard disk. The database 46 stores the time series data that has been generated from the constellation of the known state optical signal and that is referred to by the learning section 45. The database 46 also stores a known state and a feature of the constellation in association with each other. Note here that the feature of the constellation, the feature being stored in the database 46 and associated with the known state, is a feature obtained by inputting the constellation to the learned model (described earlier) and outputting a feature of the constellation from the learned model.

Example of Process Carried Out by Optical Signal State Estimation Apparatus 40

An example of a process carried out by the optical signal state estimation apparatus 40 will be described.

First, the acquisition section 41 acquires the I channel Ix' for the X-polarized wave, the Q channel Qx' for the X-polarized wave, the I channel Iy' for the Y-polarized wave, and the Q channel Qy' for the Y-polarized wave. The I channel Ix' and the Q channel Qx' are output from the ADC 34-1, and the I channel Iy' and the Q channel Qy' are output from the ADC 34-2.

Figure 4:
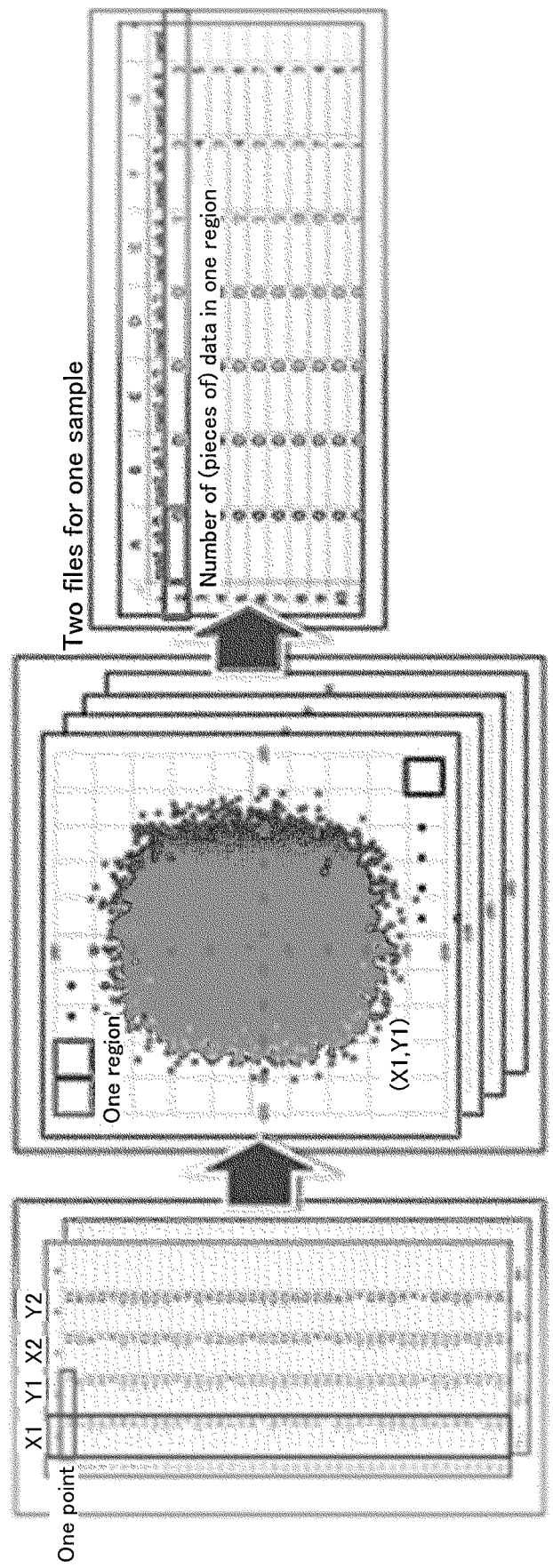
FIG. 4 is a diagram illustrating an example of a process carried out by a preprocessing section according to the second example embodiment of the present invention.

Subsequently, an example of a process carried out by the preprocessing section 42 will be described with reference to FIG. 4. FIG. 4 is a diagram illustrating an example of the process carried out by the preprocessing section 42 according to the present example embodiment.

The preprocessing section 42 acquires the I channel Ix' for the X-polarized wave, the Q channel Qx' for the X-polarized wave, the I channel Iy' for the Y-polarized wave, and the Q channel Qy' for the Y-polarized wave. The I channel Ix', the Q channel Qx', the I channel Iy', and the Q channel Qy' have been acquired by the acquisition section 41 within a certain time period. For example, as illustrated at the left end of FIG. 4, the preprocessing section 42 acquires the I channel Ix' for the X-polarized wave, the Q channel Qx' for the X-polarized wave, the I channel Iy' for the Y-polarized wave, and the Q channel Qy' for the Y-polarized wave as X1, Y1, X2, and Y2, respectively. The I channel Ix', the Q channel Qx', the I channel Iy', and the Q channel Qy' have been acquired by the acquisition section 41 within a certain time period.

Note here that the certain time period is not particularly limited and may be, for example, 10 seconds or seconds. At the left end of FIG. 4, 8192 pieces or 1180 pieces of two-dimensional coordinate data (one second per sheet) are acquired. Thus, a time period for acquiring 8192 pieces or 1180 pieces of the two-dimensional coordinate data may be set as the certain time period.

Next, as illustrated in the center of FIG. 4, the preprocessing section 42 plots X1, Y1, X2, and Y2 on a complex plane. The preprocessing section 42 counts the number of signal points included in each of grids obtained by dividing the complex plane into a specific number of rows and the specific number of columns (m rows×n columns). The specific number m and the specific number n are not particularly limited, but are each 10 in the diagram illustrated in the center of FIG. 4. In other words, the complex plane is divided into 10 rows×10 columns ten rows in the diagram illustrated in the center of FIG. 4.

The specific number may be a number in accordance with a modulation method for the optical signal. For example, in a case where the modulation method for the optical signal is a 16QAM modulation method, the preprocessing section 42 may generate time series data in which pieces of histogram information are arranged in time series, the histogram information being obtained by counting the number of signal points included in each of grids obtained by dividing the complex plane by the specific number of 10.

As another example, in a case where the modulation method for the optical signal is a 2A8PSK modulation method, the preprocessing section 42 may generate time series data in which pieces of histogram information are arranged in time series, the histogram information being obtained by counting the number of signal points included in each of grids obtained by dividing the complex plane by the specific number of 10.

With the above configuration, the optical signal state estimation apparatus 40 can estimate a signal state of the optical signal in accordance with the modulation method.

Furthermore, the preprocessing section 42 may be configured to generate time series data by arranging pieces of histogram information in time series, the histogram information being obtained by counting the number of signal points included in each of grids obtained by dividing the complex plane into numbers of rows and columns, the numbers being in accordance with a known state in which a learned model (described later) is trained. For example, in a case where the known state in which the learned model is trained is crosstalk or band narrowing, the time series data may be generated in which pieces of histogram information are arranged in time series, the histogram information being obtained by counting the number of signal points included in each of grids obtained by dividing the complex plane by a number (e.g., 8, 16, or the like) different from the specific number of 10.

Subsequently, the generation section 43 measures the number of signal points included in each of the grids of m rows×n columns, and creates m×n pieces of data. That is, the generation section 43 generates m×n pieces of time series data.

In the diagram illustrated in the center of FIG. 4, the complex plane is divided into 10 rows×10 columns as described above. Thus, the preprocessing section 42 creates pieces of time series data. FIG. 4 illustrates a case where the preprocessing section 42 creates two files of the following data: (i) data obtained by preprocessing the channel Ix' for the X-polarized wave and the Q channel Qx' for the X-polarized wave, the I channel Ix' and the Q channel Qx' each being output from the ADC 34-1; and (ii) data obtained by preprocessing the I channel Iy' for the Y-polarized wave and the Q channel Qy' for the Y-polarized wave, the I channel Iy' and the Q channel Qy' each being output from the ADC 34-2.

In a case where the generation section 43 generates m×n pieces of time series data, the estimation section 44 inputs the M×N time series data to a learned model. The learned model is as described above. Then, the estimation section 44 estimates the signal state of the optical signal on the basis of an output of the learned model.

For example, the estimation section 44 acquires, from the learned model, a feature of the time series data generated from a constellation of an optical signal to be estimated. The estimation section 44 refers to the database 46, and estimates, in a case where a feature approximating the acquired feature is stored in the database 46, that the known state associated with the feature in the database 46 is the signal state of the optical signal.

The estimation section 44 thus estimates the signal state of the optical signal in accordance with whether time series data having a feature approximating the feature of the time series data generated from the constellation of the optical signal to be estimated was present in the past. Thus, since the estimation section 44 estimates the state of the optical signal in consideration of a change in constellation caused by the passage of time, it is possible to estimate the signal state of the optical signal with high accuracy.

For example, the estimation section 44 may input, to the learned model at predetermined intervals, the time series data generated from the constellation of the optical signal to be estimated. For example, the following description takes, as an example, a case where time series data is generated on the basis of the constellation of the optical signal to be estimated, the constellation having been acquired within 10 seconds, and the time series data is input to the learned model at intervals of 1 second from 9:00:00.

First, the estimation section 44 inputs, to the learned model, time series data generated on the basis of the constellation of the optical signal to be estimated, the constellation having been acquired within 10 seconds from 9:00:00 to 9:00:10, and estimates the state of the optical signal. Next, the estimation section 44 inputs, to the learned model, time series data generated on the basis of the constellation of the optical signal to be estimated, the constellation having been acquired within 10 seconds from 9:00:01 to 9:00:11, which is 1 second after 9:00:00 to 9:00:10, and estimates the state of the optical signal.

In this way, a configuration is employed such that the optical signal multiplexing apparatus 100 according to the present example embodiment includes: the acquisition section 41 that acquires a constellation of an optical signal; the preprocessing section 42 and the generation section 43 each of which generates time series data in which pieces of histogram information are arranged in time series, the histogram information being obtained by counting the number of signal points of the constellation that has been acquired within a certain time period, the signal points being included in each of grids obtained by dividing an in-phase component direction and a quadrature component direction into a specific number of rows and the specific number of columns, respectively; and the estimation section 44 that estimates, by inputting, to a learned model trained with use of the time series data that has been generated from a constellation of a known state optical signal, the time series data that has been generated from the constellation of the optical signal to be estimated, a state of the optical signal to be estimated. Thus, the optical signal multiplexing apparatus 100 according to the present example embodiment makes it possible to estimate a signal state of an optical signal with high accuracy.

Example 1

Figure 5:
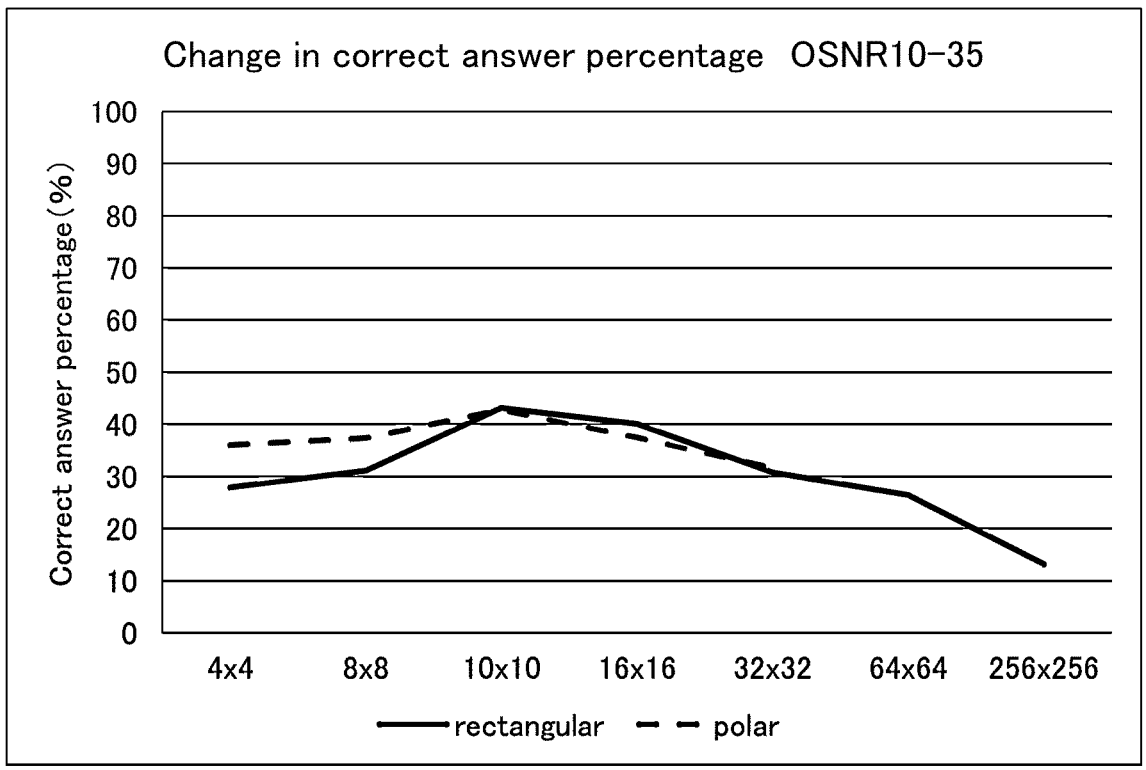
FIG. 5 is a graph showing a relationship between a grid number and a correct answer number in each Example.
Figure 5:
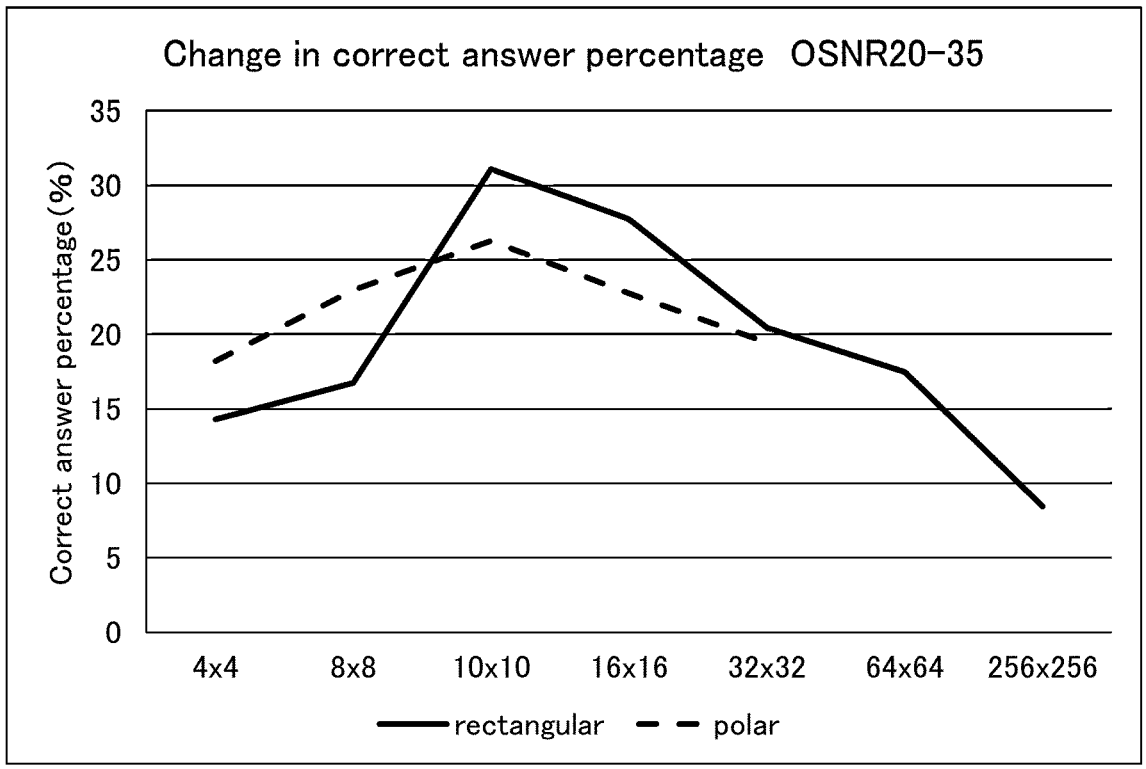

An example of the present invention will be described below with reference to the upper side of FIG. 5. FIG. 5 has graphs showing relationships between a grid number and a correct answer percentage in Examples 1 and 2.

The upper side of FIG. 5 is a graph in which the correct answer percentage is calculated for each grid number under the following conditions. A solid line shows a result obtained in a case where rectangular coordinates were used, and a dotted line shows a result obtained in a case where polar coordinates were used.

State of optical signal to be estimated: a noise ratio of 10 db to 35 db

Modulation method for optical signal: 2A8PSK modulation method

As shown on the upper side of FIG. 5, the correct answer percentage obtained in the case of division into 10×10 is the highest in both the case where rectangular coordinates were used and the case where polar coordinates were used.

Example 2

Another example of the present invention will be described below with reference to the lower side of FIG. 5.

The lower side of FIG. 5 is a graph in which the correct answer percentage is calculated for each grid number under the following conditions. A solid line shows a result obtained in a case where rectangular coordinates were used, and a dotted line shows a result obtained in a case where polar coordinates were used.

State of optical signal to be estimated: a noise ratio of 20 db to 35 db
    Modulation method for optical signal: 2A8PSK modulation method As shown on the lower side of FIG. 5, the correct answer percentage obtained in the case of division into 10×10 is the highest in both the case where rectangular coordinates were used and the case where polar coordinates were used.

Software Implementation Example

Some or all of the functions of the optical signal state estimation apparatus 1 or 40 may be realized by hardware such as an integrated circuit (IC chip) or may be alternatively realized by software.

Figure 6:
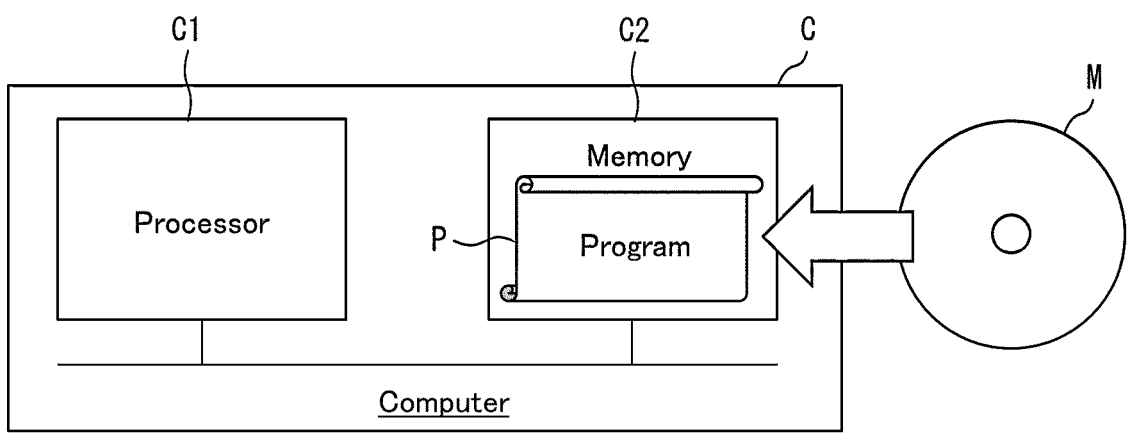
FIG. 6 is a block diagram illustrating a configuration of a computer functioning as an optical signal state estimation apparatus according to each of the example embodiments.

In the latter case, the optical signal state estimation apparatus 1 or 40 is realized by, for example, a computer that executes instructions of a program that is software realizing the functions. FIG. 6 illustrates an example of such a computer (hereinafter referred to as "computer C"). The computer C includes at least one processor C1 and at least one memory C2. The memory C2 stores a program P for causing the computer C to operate as the optical signal state estimation apparatus 1 or 40. In the computer C, the functions of the optical signal state estimation apparatus 1 or 40 are realized by the processor C1 reading the program P from the memory C2 and executing the program P.

The processor C1 may be, for example, a central processing unit (CPU), a graphic processing unit (GPU), a digital signal processor (DSP), a micro processing unit (MPU), a floating point number processing unit (FPU), a physics processing unit (PPU), a microcontroller, or a combination thereof. The memory C2 may be, for example, a flash memory, a hard disk drive (HDD), a solid state drive (SSD), or a combination thereof.

Note that the computer C may further include a random access memory (RAM) in which the program P is loaded when executed and/or in which various kinds of data are temporarily stored. The computer C may further include a communication interface for transmitting and receiving data to and from another apparatus. The computer C may further include an input/output interface for connecting the computer C to an input/output apparatus(es) such as a keyboard, a mouse, a display, and/or a printer.

The program P can also be recorded in a non-transitory tangible storage medium M from which the computer C can read the program P. Such a storage medium M may be, for example, a tape, a disk, a card, a semiconductor memory, a programmable logic circuit, or the like. The computer C can acquire the program P via the storage medium M. The program P can be transmitted via a transmission medium. The transmission medium may be, for example, a communication network, a broadcast wave, or the like. The computer C can acquire the program P also via such a transmission medium.

[Additional Remark 1]

The present invention is not limited to the foregoing example embodiments, but may be altered in various ways by a skilled person within the scope of the claims. For example, the present invention also encompasses, in its technical scope, any example embodiment derived by appropriately combining technical means disclosed in the foregoing example embodiments.

[Additional Remark 2]

The whole or part of the example embodiments disclosed above can also be described as below. Note, however, that the present invention is not limited to the following example aspects.

(Supplementary Note 1)

An optical signal state estimation apparatus that estimates a state of an optical signal transmitted through optical fiber, the optical signal state estimation apparatus including:
    an acquisition section that acquires a constellation of the optical signal;
    a generation section that generates time series data in which pieces of histogram information are arranged in time series, the histogram information being obtained by counting the number of signal points of the constellation that has been acquired within a certain time period, the signal points being included in each of grids obtained by dividing an in-phase component direction and a quadrature component direction into a specific number of rows and the specific number of columns, respectively; and
    an estimation section that estimates, by inputting, to a learned model trained with use of the time series data that has been generated from a constellation of a known state optical signal, the time series data that has been generated from the constellation of the optical signal to be estimated, a state of the optical signal to be estimated.

(Supplementary Note 2)

The optical signal state estimation apparatus according to Supplementary note 1, wherein
    the specific number is a number in accordance with a modulation method for the optical signal.

(Supplementary Note 3)

The optical signal state estimation apparatus according to Supplementary note 1 or 2, wherein
    the modulation method for the optical signal is a 16QAM modulation method, and
    the specific number is 10.

(Supplementary Note 4)

The optical signal state estimation apparatus according to Supplementary note 1 or 2, wherein
    the modulation method for the optical signal is a 2A8PSK modulation method, and
    the specific number is 10.

(Supplementary Note 5)

The optical signal state estimation apparatus according to any one of Supplementary notes 1 to 4, wherein
    the state of the optical signal is a noise ratio of the optical signal.

(Supplementary Note 6)

An optical signal multiplexing apparatus including an optical signal state estimation apparatus according to any one of Supplementary notes 1 to 5.

(Supplementary note 7)

An optical signal state estimation method including:
(a) acquiring a constellation of an optical signal transmitted through optical fiber;
(b) generating time series data in which pieces of histogram information are arranged in time series, the histogram information being obtained by counting the number of signal points of the constellation that has been acquired within a certain time period, the signal points being included in each of grids obtained by dividing an in-phase component direction and a quadrature component direction into a specific number of rows and the specific number of columns, respectively; and
(c) estimating, by inputting, to a learned model trained with use of the time series data that has been generated from a constellation of a known state optical signal, the time series data that has been generated from the constellation of the optical signal to be estimated, a state of the optical signal to be estimated,
(a), (b), and (c) each being carried out by an optical signal state estimation apparatus that estimates a state of the optical signal.

(Supplementary Note 8)

A program for causing a computer to carry out an optical signal state estimation method carried out by an optical signal state estimation apparatus that estimates a state of an optical signal transmitted through optical fiber,
the program causing the computer to carry out:
a process for acquiring a constellation of the optical signal;
a process for generating time series data in which pieces of histogram information are arranged in time series, the histogram information being obtained by counting the number of signal points of the constellation that has been acquired within a certain time period, the signal points being included in each of grids obtained by dividing an in-phase component direction and a quadrature component direction into a specific number of rows and the specific number of columns, respectively; and
a process for estimating, by inputting, to a learned model trained with use of the time series data that has been generated from a constellation of a known state optical signal, the time series data that has been generated from the constellation of the optical signal to be estimated, a state of the optical signal to be estimated.

(Supplementary Note 9)

An optical signal state estimation apparatus that includes at least one processor and that estimates a state of an optical signal transmitted through optical fiber,
the at least one processor carrying out:
an acquisition process for acquiring a constellation of the optical signal;
a generation process for generating time series data in which pieces of histogram information are arranged in time series, the histogram information being obtained by counting the number of signal points of the constellation that has been acquired within a certain time period, the signal points being included in each of grids obtained by dividing an in-phase component direction and a quadrature component direction into a specific number of rows and the specific number of columns, respectively; and
an estimation process for estimating, by inputting, to a learned model trained with use of the time series data that has been generated from a constellation of a known state optical signal, the time series data that has been generated from the constellation of the optical signal to be estimated, a state of the optical signal to be estimated.

Note that the optical signal state estimation apparatus may further include a memory, which may store a program for causing the at least one processor to carry out the acquisition process, the generation process, and the estimation process. The program may be stored in a non-transitory tangible computer-readable storage medium.

REFERENCE SIGNS LIST 1, 40 Optical signal state estimation apparatus
11, 41 Acquisition section
12, 43 Generation section
13, 44 Estimation section
31-1, 31-2 PBS
32-1, 32-2 Degree hybrid
33-1, 33-2 Light detection section
34-1, 34-2 ADC
35 DSP
42 Preprocessing section
45 Learning section
46 Database
100 Optical signal multiplexing apparatus

The invention claimed is:

1. An optical signal state estimation apparatus that estimates a state of an optical signal transmitted through optical fiber, the optical signal state estimation apparatus comprising:
at least one processor configured to execute:
an acquisition process comprising acquiring a constellation of the optical signal;
a generation process comprising generating time series data in which pieces of histogram information are arranged in time series, the histogram information being obtained by counting the number of signal points of the constellation that has been acquired within each of a plurality of certain time periods, the respective plurality of certain time periods being partially overlapped, the signal points being included in each of grids obtained by dividing an in-phase component direction and a quadrature component direction into a specific number of rows and the specific number of columns, respectively; and
an estimation process comprising estimating, by inputting, to a learned model trained with use of the time series data that has been generated from a constellation of a known state optical signal, the time series data that has been generated from the constellation of the optical signal to be estimated, a state of the optical signal to be estimated.

2. The optical signal state estimation apparatus according to claim 1, wherein the specific number is a number in accordance with a modulation method for the optical signal.

3. The optical signal state estimation apparatus according to claim 1, wherein a modulation method for the optical signal is a 16QAM modulation method, and the specific number is 10.

4. The optical signal state estimation apparatus according to claim 1, wherein a modulation method for the optical signal is a 2A8PSK modulation method, and
wherein the specific number is 10.

5. The optical signal state estimation apparatus according to claim 1, wherein the state of the optical signal is a noise ratio of the optical signal.

6. An optical signal multiplexing apparatus comprising an optical signal state estimation apparatus according to claim 1.

7. An optical signal state estimation method comprising:
(a) acquiring a constellation of an optical signal transmitted through optical fiber;
(b) generating time series data in which pieces of histogram information are arranged in time series, the histogram information being obtained by counting the number of signal points of the constellation that has been acquired within each of a plurality of certain time periods, the respective plurality of certain time periods being partially overlapped, the signal points being included in each of grids obtained by dividing an in-phase component direction and a quadrature component direction into a specific number of rows and the specific number of columns, respectively; and
(c) estimating, by inputting, to a learned model trained with use of the time series data that has been generated from a constellation of a known state optical signal, the time series data that has been generated from the constellation of the optical signal to be estimated, a state of the optical signal to be estimated,
(a), (b), and (c) each being carried out by at least one processor included in an optical signal state estimation apparatus that estimates a state of the optical signal.

8. A non-transitory computer-readable storage medium storing therein a program for causing a computer to carry out an optical signal state estimation method carried out by an optical signal state estimation apparatus that estimates a state of an optical signal transmitted through optical fiber, the program causing the computer to execute:
a process comprising acquiring a constellation of the optical signal;
a process comprising generating time series data in which pieces of histogram information are arranged in time series, the histogram information being obtained by counting the number of signal points of the constellation that has been acquired within each of a plurality of certain time periods, the respective plurality of certain time periods being partially overlapped, the signal points being included in each of grids obtained by dividing an in-phase component direction and a quadrature component direction into a specific number of rows and the specific number of columns, respectively; and
a process comprising estimating, by inputting, to a learned model trained with use of the time series data that has been generated from a constellation of a known state optical signal, the time series data that has been generated from the constellation of the optical signal to be estimated, a state of the optical signal to be estimated.

* * * * *